(12) United States Patent
Yasukawa et al.

(10) Patent No.: US 10,863,535 B2
(45) Date of Patent: Dec. 8, 2020

(54) USER EQUIPMENT AND METHOD FOR SCHEDULING REQUEST TRANSMISSION CONTROL

(71) Applicant: NTT DOCOMO, INC., Tokyo (JP)

(72) Inventors: Shimpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/089,181

(22) PCT Filed: Mar. 23, 2017

(86) PCT No.: PCT/JP2017/011710
§ 371 (c)(1),
(2) Date: Sep. 27, 2018

(87) PCT Pub. No.: WO2017/170118
PCT Pub. Date: Oct. 5, 2017

(65) Prior Publication Data
US 2019/0104537 A1    Apr. 4, 2019

(30) Foreign Application Priority Data

Mar. 31, 2016 (JP) .................... 2016-073455

(51) Int. Cl.
*H04W 72/12* (2009.01)
*H04W 72/04* (2009.01)
(Continued)

(52) U.S. Cl.
CPC ... *H04W 72/1278* (2013.01); *H04W 72/0446* (2013.01); *H04W 74/0833* (2013.01); *H04W 88/02* (2013.01)

(58) Field of Classification Search
None
See application file for complete search history.

(56) References Cited

U.S. PATENT DOCUMENTS 9,210,617 B2 * 12/2015 Pan .................... H04L 5/14
2006/0189334 A1    8/2006 Wakabayashi
(Continued)

FOREIGN PATENT DOCUMENTS

| JP | 2010114681 A | 5/2010 |
|---|---|---|
| JP | 2015520533 A | 7/2015 |
| WO | 2005034545 A1 | 4/2005 |

OTHER PUBLICATIONS

3GPP TS 36321 V13.0.0; "3rd Generation Partnership Project; Technical Specification Group Radio Access Network; Evolved Universal Terrestrial Radio Access (E-UTRA); Medium Access Control (MAC) protocol specification (Release 13)"; Dec. 2015 (82 pages).

(Continued)

*Primary Examiner* — Ayaz R Sheikh
*Assistant Examiner* — Faiyazkhan Ghafoerkhan
(74) *Attorney, Agent, or Firm* — Osha Bergman Watanabe & Burton LLP

(57) ABSTRACT

A transmission control technique is provided that is for a scheduling request to reduce latency in uplink transmission. An aspect of the present invention relates to a user equipment including a transceiver that transmits and receives a radio signal to and from a base station; and a scheduling request controller that adjusts a transmission period of a scheduling request in accordance with one or more scheduling request configurations in response to downlink control signaling.

4 Claims, 8 Drawing Sheets

| Timer_FlexSR | 0···N−1 | N···2N−1 | ··· | |
|---|---|---|---|---|
| t | 1 | 2 | | Max_t |

| SR configuration Index $I\_SR$ | SR periodicity (TTI) $SR\_period$ | SR subframe offset $N_{OFFSET,SR}$ |
|---|---|---|
| 0−C1−1 | 5t | I_SR |
| C1−C2−1 | 10t | I_SR−C1 |
| C2−C3−1 | 20t | I_SR−C2 |
| C3−C4−1 | 40t | I_SR−C3 |
| C4−C5−1 | 80t | I_SR−C4 |
| C5−C6−1 | 2t | I_SR−C5 |
| C6−C7−1 | T | I_SR−C6 |

$$\left(10 \times n_f + \left\lfloor \frac{n_s}{2} \right\rfloor - N_{OFFSET,SR} + M\right) \bmod SR_{period} = 0$$

(51) Int. Cl.
*H04W 74/08* (2009.01)
*H04W 88/02* (2009.01)

(56) References Cited

U.S. PATENT DOCUMENTS

| | | | |
|---|---|---|---|
| 2011/0058572 A1* | 3/2011 | Du | H04W 74/006 370/458 |
| 2012/0069793 A1* | 3/2012 | Chung | H04W 76/27 370/315 |
| 2012/0122465 A1* | 5/2012 | Landstrom | H04W 72/1252 455/450 |
| 2013/0034069 A1* | 2/2013 | Uemura | H04W 72/0413 370/329 |
| 2013/0081026 A1 | 3/2013 | Malkamaki et al. | |
| 2013/0250828 A1* | 9/2013 | Chou | H04L 5/0053 370/311 |
| 2013/0301446 A1* | 11/2013 | Chen | H04W 72/1284 370/252 |
| 2014/0286233 A1* | 9/2014 | Chung | H04B 7/15542 370/315 |
| 2014/0328315 A1* | 11/2014 | Dinan | H04L 5/0007 370/330 |
| 2015/0131609 A1* | 5/2015 | Dinan | H04B 7/0617 370/330 |
| 2015/0156764 A1* | 6/2015 | Yang | H04L 5/001 370/329 |
| 2015/0288503 A1* | 10/2015 | Earnshaw | H04L 5/006 370/280 |
| 2016/0006498 A1* | 1/2016 | Chung | H04W 72/0446 370/315 |
| 2016/0242163 A1* | 8/2016 | Kwon | H04W 72/0406 |
| 2016/0270110 A1* | 9/2016 | Dinan | H04W 72/0486 |
| 2016/0270114 A1* | 9/2016 | Dinan | H04L 5/0091 |
| 2016/0365959 A1* | 12/2016 | Dinan | H04L 5/0055 |
| 2016/0366675 A1* | 12/2016 | Dinan | H04W 24/10 |
| 2016/0366681 A1* | 12/2016 | Dinan | H04L 5/0091 |
| 2017/0310433 A1* | 10/2017 | Dinan | H04L 5/0046 |

OTHER PUBLICATIONS

3GPP TS 36.213 V13.0.1; "3rd Generation Partnership Project; Technical Specification Group Radio Access Network; Evolved Universal Terrestrial Radio Access (E-UTRA); Physical layer procedures (Release 13)"; Jan. 2016 (326 pages).
International Search Report issued for PCT/JP2017/011710, dated Jun. 6, 2017 (5 pages).
Written Opinion issued for PCT/JP2017/011710, dated Jun. 6, 2017 (12 pages).
Extended European Search Report issued in counterpart European Patent Application No. 17774659.1, dated Sep. 20, 2019 (8 Pages).

* cited by examiner

|  | Reliability (%) | E2E latency (ms) | Data rate (Mbps) |
|---|---|---|---|
| Case 1 | [99.999] | [1-10] | [1-5] |
| Case 2 | [99.999] | [10-100] | [50-500] |

FIG.8

| Timer_FlexSR | 0···N−1 | N···2N−1 | ... |  |
|---|---|---|---|---|
| t | 1 | 2 |  | Max_t |

| SR configuration Index $I_{SR}$ | SR periodicity (TTI) $SR\_period$ | SR subframe offset $N_{OFFSET,SR}$ |
|---|---|---|
| 0−C1−1 | 5t | $I\_SR$ |
| C1−C2−1 | 10t | $I\_SR$−C1 |
| C2−C3−1 | 20t | $I\_SR$−C2 |
| C3−C4−1 | 40t | $I\_SR$−C3 |
| C4−C5−1 | 80t | $I\_SR$−C4 |
| C5−C6−1 | 2t | $I\_SR$−C5 |
| C6−C7−1 | T | $I\_SR$−C6 |

$$\left(10 \times n_f + \left\lfloor \frac{n_s}{2} \right\rfloor - N_{OFFSET,SR} + M\right) \mod SR_{period} = 0$$

USER EQUIPMENT AND METHOD FOR SCHEDULING REQUEST TRANSMISSION CONTROL

TECHNICAL FIELD

The present invention relates to a radio communication system.

BACKGROUND ART

Currently, development of an ultra reliability and low latency communication (URLCC) is in progress to achieve a radio communication with low latency and high reliability. As a case of using the URLCC, automatic traffic control and driving, a robot control network for cooperation of robots, a remote object operation such as remote operation, a remote control of a drone, remote health monitoring such as health sensor control and monitoring, public safety, and the like are assumed.

In the URLLC, typically, Case 1 with ultra-low latency and low data rate, and Case 2 with low latency and high data rate are considered. Specifically, Case 1 and Case 2 have required conditions as illustrated in FIG. 1. For example, Case 1 may be required in use cases such as platooning in automatic driving, a remote machine control, tactile interaction (for example, remote operation, remote control robot and game) for a remote machine control and augmented reality (AR)/virtual reality (VR). Whereas, for example, Case 2 may be required in use cases such as a video in which a latency request is in the order of 10 ms, cooperative dynamic map updating in automatic driving, and visual feedback (for example, remote operation, remote control robot and game) for a remote machine control and AR/VR. In addition, V2X may be the most challenging use case when considering relatively higher connection density and mobility.

In a long term evolution (LTE) system and an LTE-advance system, as illustrated in FIG. 2, a user equipment (UE) and a base station (evolved NodeB: eNB) execute uplink transmission in a procedure as illustrated in FIG. 2. That is, when uplink data to be transmitted occurs in the user equipment, the user equipment transmits a scheduling request (SR) to the base station. The base station transmits an uplink grant in response to the scheduling request so as to permit transmission by the user equipment. When receiving the uplink grant, the user equipment transmits a buffer status report (BSR) indicating a data size of the uplink data to be transmitted, and then transmits uplink data in a physical uplink shared channel (PUSCH) that is allocated by the base station on the basis of the buffer status report.

PRIOR ART DOCUMENT

Non-Patent Document

Non-Patent Document 1: 3GPP TS 36.213 V13.0.1
Non-Patent Document 2: 3GPP TS 36.321 V13.0.1

SUMMARY OF THE INVENTION

Problem to be Solved by the Invention

It is required to reduce latency due to the scheduling request and the buffer status report in the procedure so as to achieve a radio communication with low latency and high reliability.

In a scheduling request transmission control according to a periodic mode, a scheduling request transmission opportunity periodically occurs for the user equipment until a time alignment (TA) timer expires. Then, when the TA timer expires, a transmission period of the scheduling request transitions to a relatively longer random access channel (RACH) transmission period. As a result, a transmission interval of the scheduling request rapidly increases, and thus transmission latency of the scheduling request transmission may occur. In addition, in the periodic mode, the transmission period of the scheduling request is set to be fixed, and thus there is a demand for a configuration capable of controlling the scheduling request period in a more flexible manner.

In view of the above-described problem, an object of the invention is to provide a transmission control technique for a scheduling request to reduce latency in uplink transmission.

Means for Solving the Problem

To solve the above-described problem, an aspect of the present invention relates to a user equipment including a transceiver that transmits and receives a radio signal to and from a base station; and a scheduling request controller that adjusts a transmission period of a scheduling request in accordance with one or more scheduling request configurations in response to downlink control signaling.

Advantage of the Invention

According to the present invention, a transmission control technique can be provided which is for a scheduling request to reduce latency in uplink transmission.

BRIEF DESCRIPTION OF DRAWINGS

FIG. 8 is a schematic view illustrating a calculation example of a transmission period by the transmission interval increment mode according to an embodiment of the invention;

EMBODIMENTS OF THE INVENTION

Embodiments of the invention are described below based on the accompanying drawings.

In the following example, a user equipment, which transmits a scheduling request according to a scheduling request configuration, is disclosed. In the following example, the user equipment adjusts a transmission period of the scheduling request in response to reception of downlink control signaling such as an uplink grant and/or a timing advance (TA) command. For example, the user equipment may change the transmission period of the scheduling request in accordance with a transmission interval increment mode in which a transmission interval of the scheduling request is gradually extended and/or a burst mode in which the scheduling request is transmitted in burst. Here, in either the transmission interval increment mode or the burst mode, immediately after receiving the downlink control signaling, the user equipment can transmit the scheduling request in high frequency, and can flexibly adjust the transmission period of the scheduling request. As a result, it is possible to reduce latency in uplink transmission.

Figure 3:
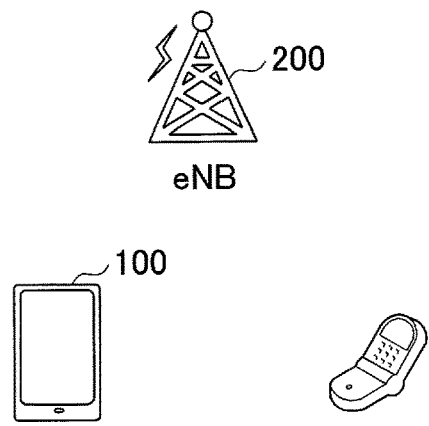
FIG. 3 is a schematic view illustrating a radio communication system according to an embodiment of the invention.

First, a radio communication system according to an embodiment of the invention is described by referring to FIG. 3. FIG. 3 is a schematic view illustrating the radio communication system according to the embodiment of the invention.

As illustrated in FIG. 3, a radio communication system 10 includes a user equipment 100 and a base station 200. For example, the radio communication system 10 is a radio communication system conforming to a standard according to a $3^{rd}$ generation partnership project (3GPP) such as an LTE system, an LTE-advanced system, and a 5G system. In the example in the drawing, only one base station 200 is illustrated, but a plurality of the base stations 200 are disposed to cover a service area of the radio communication system 10.

The user equipment (UE) 100 transmits and receives a radio signal to and from the base station 200 through a cell that is provided by the base station 200. Typically, as illustrated in the drawing, the user equipment 100 may be any appropriate information processing apparatus such as a smartphone, a portable telephone, a tablet, a mobile router, and a wearable terminal which are provided with a radio communication function. In addition, the user equipment 100 may be provided with a device-to-device (D2D) function capable of performing a communication with another user equipment 100 without intervention of the base station 200.

Figure 4:
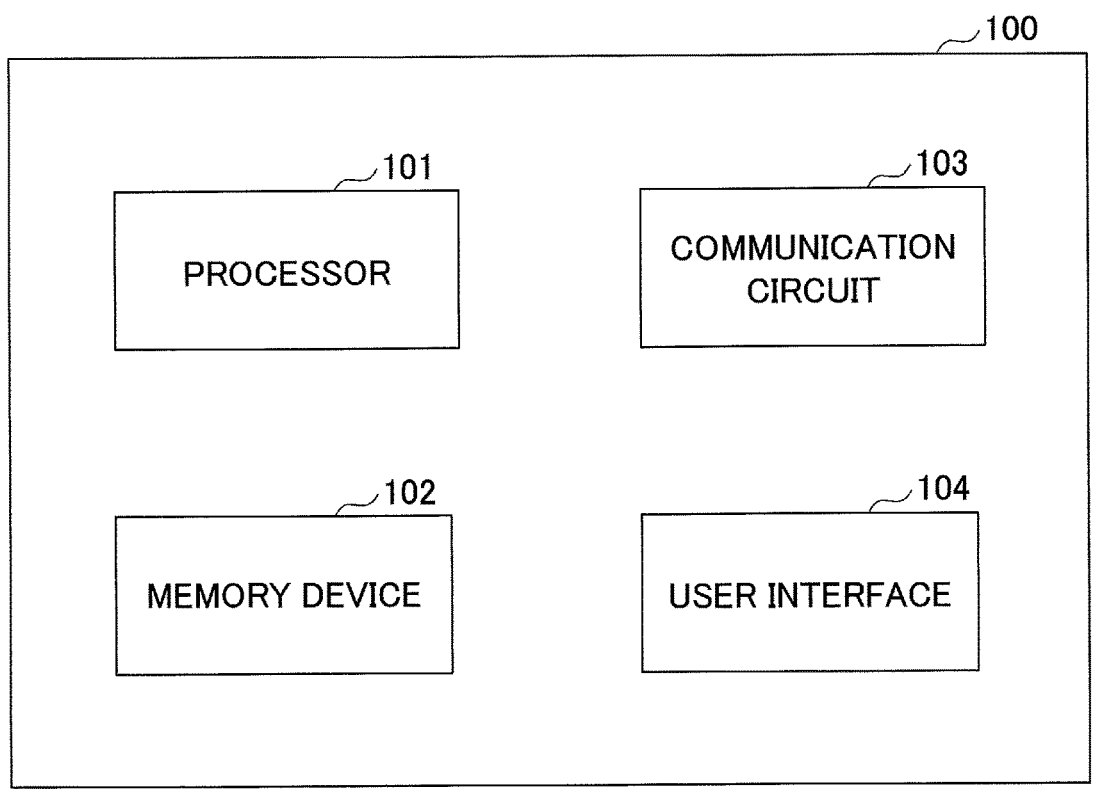
FIG. 4 is a block diagram illustrating a hardware configuration of a user equipment according to an embodiment of the invention.

As illustrated in FIG. 4, the user equipment 100 is formed of hardware resources such as a processor 101 that functions as a central processing unit (CPU), a memory device 102 such as a random access memory (RAM) and/or a flash memory, a communication circuit 103 that transmits and receives a radio signal to and from the base station 200, an user interface 104 such as an input and output device and/or a peripheral device, and the like. For example, each function and each kind of processing of the user equipment 100 described below may be implemented by processing or execution of data and/or a program, which is stored in the memory device 102, by the processor 101. However, the user equipment 100 is not limited to the above-described hardware configuration, and may be formed of a circuit that implements one or more kinds of processing described below, and the like.

The base station (eNB) 200 is wirelessly connected to the user equipment 100 to transmit a downlink (DL) packet received from a higher station and/or a server that is communicatively connected to a core network (not illustrated) to the user equipment 100, and transmits an uplink (UL) packet received from the user equipment 100 to a server.

Figure 5:
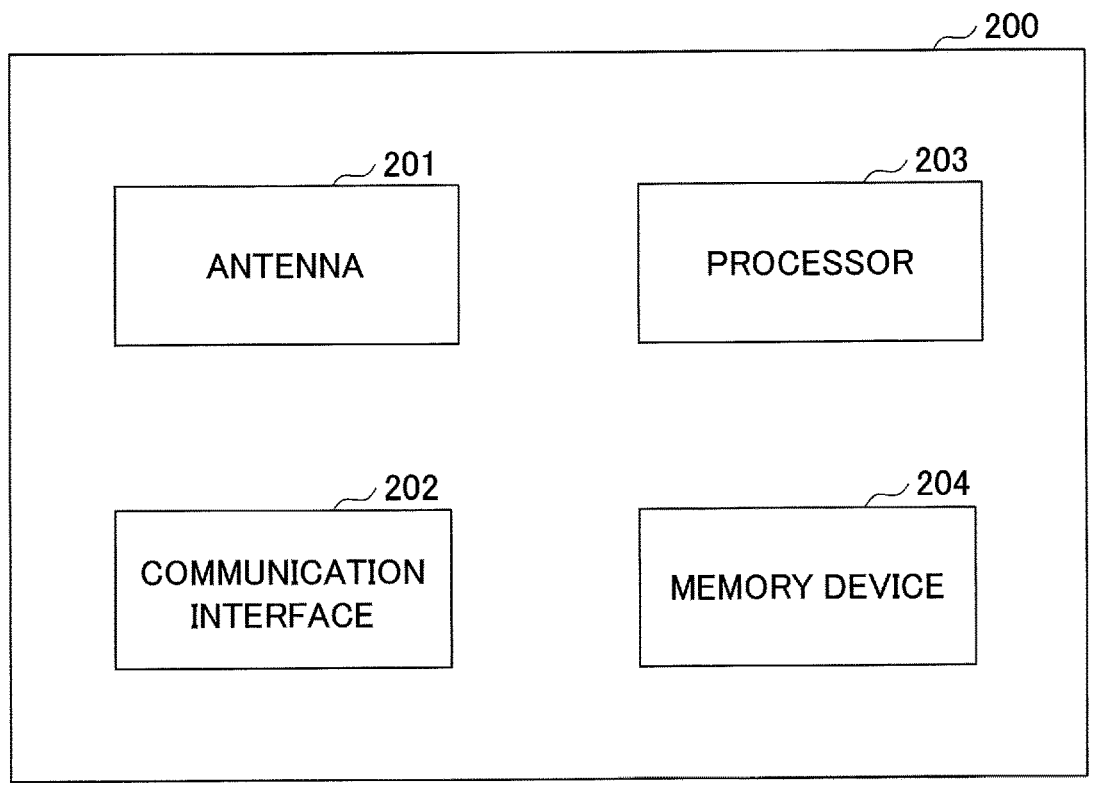
FIG. 5 is a block diagram illustrating a hardware configuration of a base station according to an embodiment of the invention.

As illustrated in FIG. 5, typically, the base station 200 is constituted by hardware resources such as an antenna 201 that transmits and receive a radio signal to and from the user equipment 100, a communication interface 202 including an X2 interface for a communication with an adjacent base station 200 and an S1 interface for a communication with the core network (not illustrated), a processor 203 that processes a signal that is transmitted to and received from the user equipment 100, and a memory device 204. Each function and each kind of processing of the base station 200 described below may be implemented by processing or execution of data and/or a program, which is stored in the memory device 204, by the processor 203. However, the base station 200 is not limited to the above-described hardware configuration and may have any appropriate hardware configuration.

Figure 6:
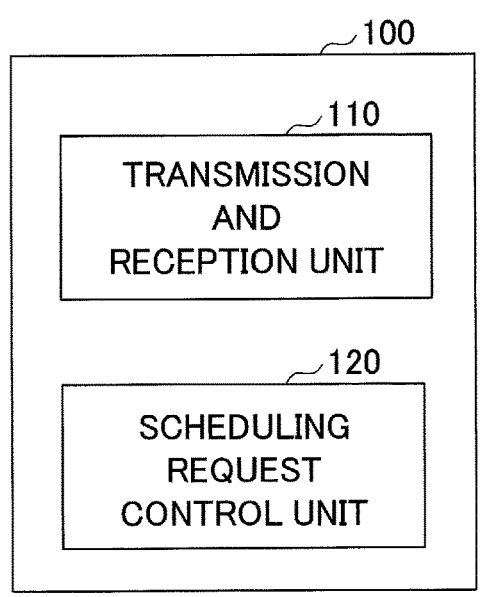
FIG. 6 is a block diagram illustrating a functional configuration of the user equipment according to an embodiment of the invention.

Next, the user equipment according to an embodiment of the invention is described by referring to FIG. 6. FIG. 6 is a block diagram illustrating a functional configuration of the user equipment according to the embodiment of the invention.

As illustrated in FIG. 6, the user equipment 100 includes a transmission and reception unit 110 and a scheduling request control unit 120.

Figures 1, 2:
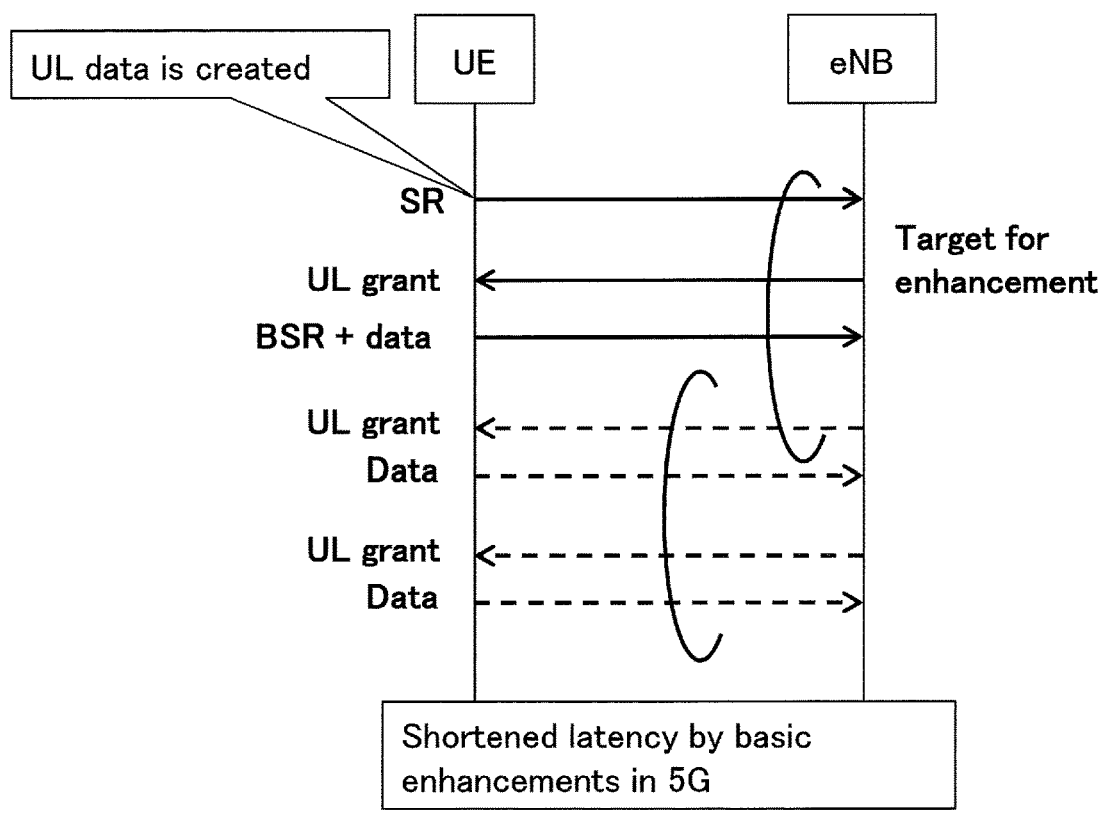
FIG. 1 is a schematic view illustrating required conditions in a URLLC.
FIG. 2 is a sequence diagram illustrating an uplink transmission procedure.

The transmission and reception unit 110 transmits and receives a radio signal to and from the base station 200. Specifically, the transmission and reception unit 110 transmits and receives various radio channels such as an uplink/downlink control channel and/or an uplink/downlink data channel to and from the base station 200. As described above with reference to FIG. 2, when data to be transmitted occurs in the user equipment 100, the transmission and reception unit 110 transmits a scheduling request to the base station 200 so as to make a request for the base station 200 to allocate a PUSCH for transmission of the data. When receiving an uplink grant with respect to the scheduling request from the base station 200, the transmission and reception unit 110 transmits a buffer status report, which indicates a size of the data to be transmitted, to the base station 200, and transmits uplink data in a PUSCH set by the base station 200 on the basis of the buffer status report.

The scheduling request control unit 120 adjusts a transmission period of the scheduling request according to one or more scheduling request configurations in response to downlink control signaling. Specifically, the scheduling request control unit 120 changes the transmission period of the scheduling request in response to reception of the downlink control signaling such as an uplink grant and/or a timing advance (TA) command. The changing of the transmission period of the scheduling request may be performed in accordance with one or more scheduling request configurations such as a transmission interval increment mode, a burst mode, a periodic mode in which a transmission interval is the same or different in each case. The modes are described below.

Figure 7:
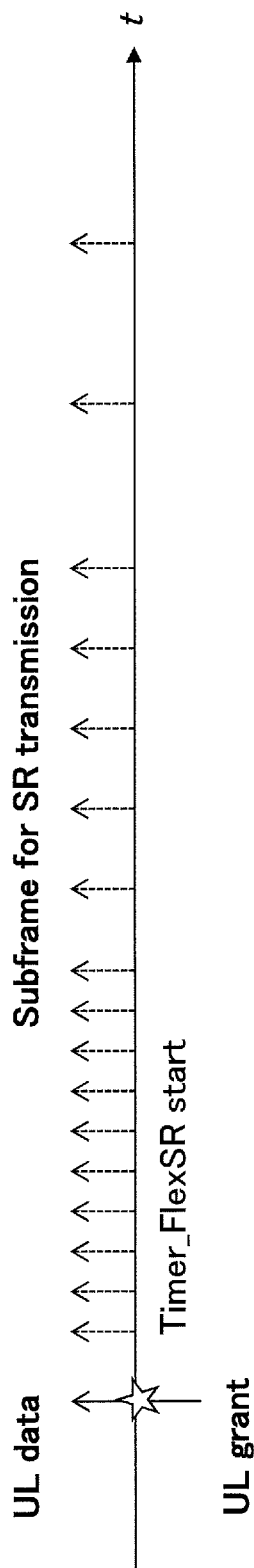
FIG. 7 is a schematic view illustrating transmission processing of a scheduling request by a transmission interval increment mode according to an embodiment of the invention.
Figure 9:
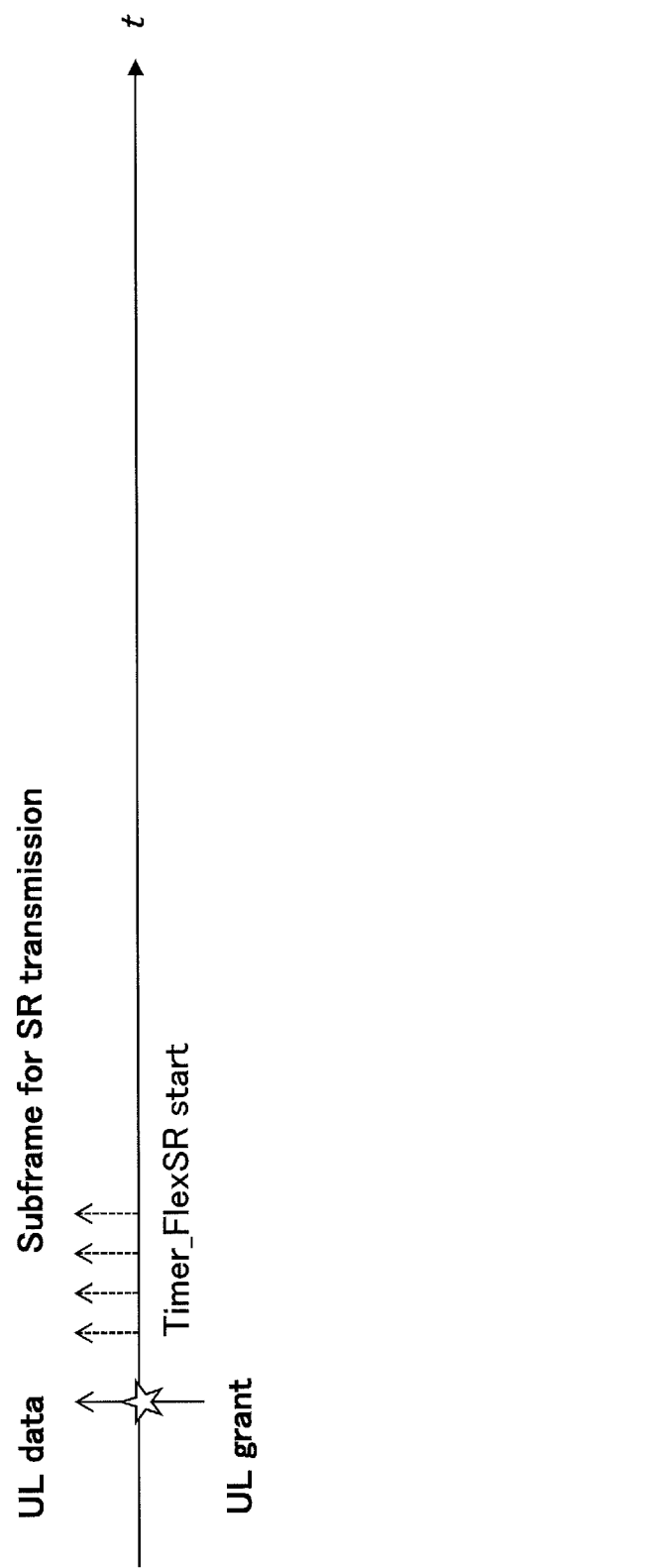
FIG. 9 is a schematic view illustrating transmission processing of a scheduling request by a burst mode according to an embodiment of the invention.

In the embodiment, the one or more scheduling request configuration may include the transmission interval increment mode in which the transmission interval of the scheduling request is gradually extended. Specifically, the scheduling request control unit 120 can transmit the scheduling request in accordance with the transmission interval increment mode, in which the transmission interval of the scheduling request is set to be gradually extended as illustrated in FIG. 7, in response to reception of the uplink grant. As illustrated in the drawing, immediately after reception of the uplink grant, the scheduling request control unit 120 can transmit the scheduling request in relatively high transmission frequency. However, the transmission frequency of the scheduling request is set to be relatively low, as it departs from the time point of the reception of the uplink grant. According to this, it is possible to gradually decrease uplink scheduling latency in comparison to a periodic mode of the related art in which the latency necessary for uplink scheduling rapidly increases after a predetermined period of time.

As illustrated in the drawing, the transmission frequency adjustment according to the transmission interval increment mode may be performed step by step. To achieve this, for example, the scheduling request control unit 120 may use a timer Timer_FlexSR as illustrated in FIG. 8. In a specific example illustrated in the drawing, when an uplink grant is received, Timer_FlexSR is activated. In $0, \ldots, (N-1)^{th}$ subframes, Timer_FlexSR is set to t=1. In $N, \ldots, (2N-1)^{th}$ subframes, Timer_FlexSR is set to t=2. "t" increments by 1 until reaching the maximum value Max_t of Timer_FlexSR for every subsequent N subframes. That is, "t" increments for every constant number of subframes. According to the increase in "t", a transmission period SR-period of the scheduling request increases in accordance with a table illustrated in the drawing. For example, with regard to a scheduling request configuration in which an index I_SR is 0 to C1-1, in the $0, \ldots, (N-1)^{th}$ subframes, the scheduling request can be transmitted in a transmission period of 5×1=5 ms, and in $N, (2N-1)^{th}$ subframes, the scheduling request can be transmitted in a transmission period of 5×2=10 ms. The same applies to the following. Furthermore, when the uplink grant is received from the base station 200, Timer_FlexSR is initialized (t=1). In this manner, the transmission period SR-period of the scheduling request is extended step by step in accordance with the timer value t. Here, the extended SR-period or the timer value t may not exceed a predetermined maximum period.

In addition, the scheduling request control unit 120 may increase an offset of the transmission timing of the scheduling request in correspondence with extension of a transmission interval in the transmission interval increment mode. Specifically, the base station 200 sets an offset indicator M that is peculiar to each of a plurality of the user equipments 100 so as to disperse transmission timing of the user equipment 100. The scheduling request control unit 120 applies the offset indicator M, which is set by the base station 200, to Expression in FIG. 8 to determine transmission timing of the scheduling request in each transmission period. In Expression illustrated in the drawing, modulo operation is performed by the extended SR period, and thus calculated transmission timing of the scheduling request is determined in an offset range that is extended in correspondence with the SR period.

In another embodiment, one or more scheduling request configurations may include a burst mode in which the scheduling request is transmitted in burst. In the burst mode, as illustrated in FIG. 8, the scheduling request control unit 120 can transmit the scheduling request in a relatively short transmission interval immediately after reception of the uplink grant (for example, in a predetermined period from reception of downlink control signaling) in response to reception of the uplink grant. According to this, it is possible to obtain more uplink data transmission opportunities for uplink immediately after reception of the uplink grant.

In the embodiment, the scheduling request control unit 120 may adjust the transmission period of the scheduling request in accordance with a plurality of scheduling request configurations. For example, the scheduling request control unit 120 may adjust the transmission period of the scheduling request in accordance with both the periodic mode in which the scheduling request is transmitted in a constant transmission interval, and the burst mode in which the scheduling request is transmitted in burst. Here, the scheduling request control unit 120 may apply one of a plurality of the scheduling request configurations for each bearer. For example, the scheduling request control unit 120 may apply the periodic mode with respect to a part of a plurality of the bearers and may apply the burst mode with respect to the other bearers. In addition, the scheduling request control unit 120 may adjust the transmission period of the scheduling request in accordance with two or more of the transmission interval increment mode, the periodic mode, and the burst mode. In this manner, it is possible to apply a scheduling request configuration that is suitable for transmission characteristics of a bearer.

Figure 10:
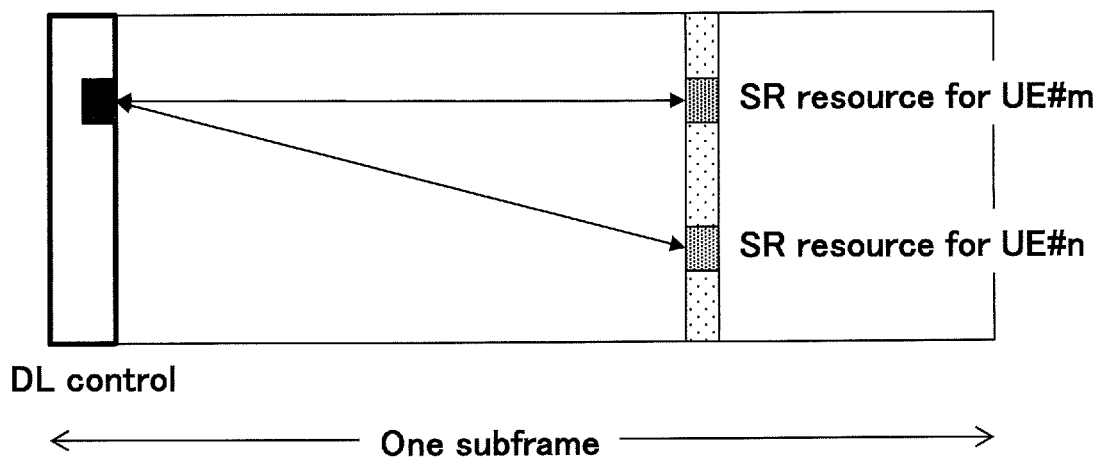
FIG. 10 is a schematic view illustrating dynamic designation of a scheduling request resource by downlink control signaling according to an embodiment of the invention.

In an embodiment, notification of availability of a resource, which is allocated for the scheduling request, may be made by the base station 200. For example, in a time division duplex (TDD) communication, the base station 200 may desire to transmit a downlink traffic in a scheduling request (SR) resource that is allocated to the user equipment 100 in some case. In this case, the base station 200 may dynamically disallow, through downlink control signaling, the user equipment 100 to use the SR resource. For example, as illustrated in FIG. 10, the base station 200 may make a notification of "non-availability of the SR resource by the user equipment 100 in a predetermined region of a subframe including an SR resource", and the scheduling request control unit 120 may determine whether or not the SR resource is valid with reference to the region. Furthermore, the availability of the SR resource may be indicated by a subframe unit or a symbol unit of the SR resource. In addition, signaling indicating availability of the SR resource may be dynamic TDD configuration signaling, or dedicated signaling indicating the availability of the SR resource. As a result, when the base station 200 is to prioritize a downlink traffic, the base station 200 can dynamically disallow the user equipment 100 to transmit the scheduling request, and can cause the user equipment 100 to receive the downlink traffic in the SR resource. In addition, in a TDD communication, the user equipment 100 may assume that the configured SR resource is always an uplink resource; the user equipment 100 may assume that the configured SR resource is an uplink resource only if the base station 200 indicates it; or the user equipment 100 may assume that the configured SR resource is an uplink resource if dynamic control signaling reports that it is an uplink.

Additionally, if there is no SR resource that can be used for a predetermined time, a signal may be transmitted which is for requesting random access and/or a SR resource (an uplink subframe). At this time, a resource and/or a sequence that is different from that of usual non-contention based random access may be used, and a response to random access may be replaced with a downlink control CH, for example, uplink scheduling (a UL grant). The shortage of the SR resources can be resolved in a case in which there are a large number of downlink subframes, and signaling overhead related to the response to the random access can be reduced.

The block diagrams used for the descriptions of the above-described embodiment represent blocks on a function-by-function basis. These functional blocks (components) are implemented by any combination of hardware and/or software. Here, a means for implementing each functional block is not particularly limited. Namely, each functional block may be implemented by one device that is physically and/or logically combined, or may be implemented by a plurality of devices that is obtained by directly and/or indirectly (e.g., wired and/or wireless) connecting two or more devices that are physically and/or logically separated.

Figure 11:
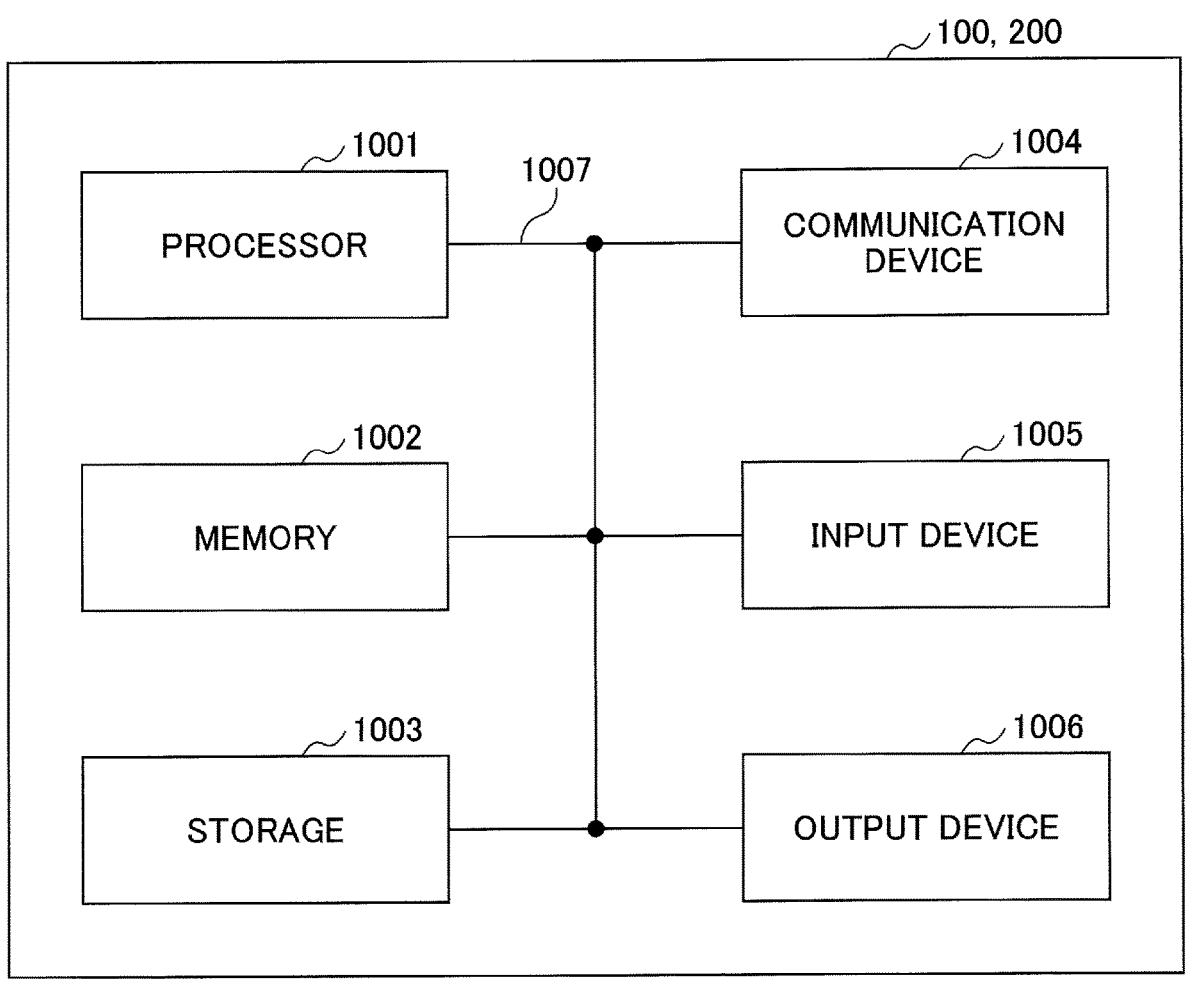
FIG. 11 is a block diagram illustrating hardware configurations of the user equipment and the base station according to an embodiment of the invention.

For example, the user equipment 100 and the base station 200 according to the embodiment of the present invention may function as computers for executing a process of the radio communication method of the present invention. FIG. 11 is a block diagram illustrating a hardware configuration of each of the base user equipment 100 and the base station 200 according to the embodiment of the present invention. Each of the above-described user equipment 100 and base station 200 may be physically configured as a computer device including a processor 1001, a memory 1002, a storage 1003, a communication device 1004, an input device 500, an output device 1006, a bus 1007, etc.

Note that, in the following description, the term "apparatus" can be read as a circuit, a device, a unit, etc. The hardware configuration of each of the user equipment 100 and the base station 200 may be configured to include one or more of the respective devices illustrated, or may be configured not to include a part of the devices.

Each function of the user equipment 100 and the base station 200 is implemented by loading predetermined software (program) on hardware, such as the processor 1001 and the memory 1002, so that the processor 1001 performs computation and controls communication by the communication device 1004, and reading and/or writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, each of the above-described components may be implemented by the processor 1001.

Additionally, the processor 1001 reads a program (program code), a software module and data from the storage 1003 and/or the communication device 1004 to the memory 1002, and executes various processes according to these. As the program, a program is used which causes a computer to execute at least a part of the operations described in the above-described embodiment. For example, a process by each component of each of the user equipment 100 and the base station 200 may be implemented by a control program stored in the memory 1002 and executed by the processor 1001, and another functional block may be similarly implemented. Although it is described that the above-described various processes are executed by a single processor 1001, the above-described various processes may be simultaneously or sequentially executed by two or more processors 1001. The processor 1001 may be implemented with one or more chips. Note that the program may be transmitted from a network via an electric communication line.

The memory 1002 is a computer readable recording medium, and the memory 1002 may be formed of at least one of a read-only memory (ROM), an erasable programmable ROM (EPROM), an electrically erasable programmable ROM (EEPROM), a random access memory (RAM), etc. The memory 1002 may be referred to as a register, a cache, a main memory (main storage device), etc. The memory 1002 can store executable programs (program codes), software modules, etc., that can be executed to implement the radio communication method according to the embodiment of the present invention.

The storage 1003 is a computer readable recording medium, and, for example, the storage 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The storage 1003 may be referred to as an auxiliary storage device. The above-described storage medium may be, for example, a database including the memory 1002 and/or the storage 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. For example, each of the above-described component may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the memory 1002, are connected by a bus 1007 for communicating information. The bus 1007 may be formed of a single bus, or the bus 1007 may be formed of buses that are different among the devices.

Furthermore, each of the user equipment 100 and the base station 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 101 may be implemented with at least one of these hardware components.

Notification of information is not limited the aspect/embodiment described in the present specification any may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

Processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

The specific operations that are described in the specification to be performed by the base station 200 may be performed by their upper nodes in some cases. In a network formed of one or more network nodes including a base station, it is apparent that the various operations performed for communication with the terminal may be performed by the base station and/or a network node other than the base station (e.g., MME or S-GW can be considered, however, not limited to these). In the above description, a case is exemplified in which there is one network node other than the base station. However, it can be a combination of other network nodes (e.g., MME and S-GW).

Information, etc., may be output from a higher layer (or a lower layer) to a lower layer (a higher layer). Input and output may be performed through a plurality of network nodes.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (Boolean: true or false), and may be made by comparison of numerical values (comparison with a predetermined value, for example).

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The present invention is described in detail above. It is apparent to a person ordinarily skilled in the art that the present invention is not limited to the embodiments described in the specification. The present invention can be implemented as modifications and alterations without departing from the gist and scope of the present invention that are determined by the descriptions of the claims. Accordingly, the descriptions of the present specification is for the purpose of illustration and does not have any restrictive meaning to the present invention.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, etc., regardless of whether the software is referred to as software, firmware, middleware, microcode, hardware description language or other names.

Furthermore, software, instructions, etc., may be transmitted and received via a transmission medium. For example, when the software is transmitted from a website, server, or another remote source using wired technology such as coaxial cable, fiber optic cable, twisted pair and digital subscriber line (DSL) and/or wireless technology such as infrared, radio, and microwave, these wired and/or wireless technologies are included within the definition of the transmission medium.

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

Note that the terms described in this specification and/or the terms necessary for understanding of this specification may be replaced with terms having the same or similar meaning. For example, the channel and/or symbol may be signaling (signal). Furthermore, a signal may be a message. Furthermore, a component carrier (CC) may be referred to as a carrier frequency, a cell, etc.

The terms "system" and "network" as used in this specification are used interchangeably.

Furthermore, the information, parameters, etc., described in this specification may be represented by absolute values, may be represented as relative values from predetermined values, or may be represented by any other corresponding information. For example, the radio resource may be indicated by an index.

The names used for the above-described parameters are not for limiting in any point. Furthermore, mathematical expressions, etc., using these parameters may be different from those explicitly disclosed in this specification. Since the various channels (e.g., PUCCH, PDCCH, etc.) and information elements (e.g., TPC etc.) can be identified by suitable names, the various names assigned to these various channels and information elements are not for limiting in any point.

A base station can accommodate one or more (e.g., three) cells (also referred to as sectors). When the base station accommodates a plurality of cells, the entire coverage area of the base station can be divided into a plurality of smaller areas, and each smaller area may also provide communication services by base station subsystem (e.g., indoor small base station RRH: Remote Radio Head). The term "cell" or "sector" refers to a part or all of the coverage area of a base station and/or base station subsystem that provides communication service in this coverage. Furthermore, the terms "base station," "eNB," "cell," and "sector" may be used interchangeably in this specification. The base station may also be referred to as a fixed station, a NodeB, eNodeB (eNB), an access point, a femtocell, a small cell, etc.

A mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

The terms "determine (determining)" and "decide (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The terms "connected," "coupled," or any variation thereof mean any direct or indirect connection or coupling between two or more elements, and may include the presence of one or more intermediate elements between the two elements "connected" or "coupled" to each other. The coupling or connection between the elements may be physical, logical or a combination thereof. Two elements, when used in this specification, can be considered to be mutually "connected" or "coupled by using one more more wires, cables and/or printed electrical connections, and, as some non-limiting and non-inclusive examples, by using electromagnetic energy such as electromagnetic energy with a wavelength in a radio frequency range, a microwave range, and an optical range (both visible and invisible).

The reference signal may be abbreviated as RS (Reference Signal), and may be referred to as a pilot (Pilot) according to applicable standards.

The expression "on the basis of" used in the present specification does not mean "on the basis of only" unless otherwise stated particularly. In other words, the expression "on the basis of" means both "on the basis of only" and "on the basis of at least."

Any reference to elements using names, such as "first" and "second," as used in this specification does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

"Means" in the configuration of each of the above-described devices may be replaced with "part," "circuit," "device," etc.

As long as "include," "including," and variations thereof are used in this specification or the claims, the terms are intended to be inclusive in a manner similar to the term "comprising." Furthermore, the term "or" used in the specification or claims is intended not to be an exclusive OR.

A radio frame may be formed of one or more frames in the time domain. In the time domain, each of the one or more of frames may be referred to as a subframe. A subframe may be formed of one or more slots in the time domain. A slot may be formed of one or more symbols (OFDM symbols, SC-FDMA symbols, etc.) in the time domain. Each of the radio frame, subframe, slot, and symbol represents a time unit for transmitting a signal. The radio frame, subframe, slot, and symbol may be called by respective different names. For example, in LTE system, the base station performs scheduling to allocate radio resources (a frequency bandwidth, transmission power, etc., that can be used by each mobile station) to each mobile station. The minimum time unit of scheduling may be referred to as TTI (Transmission Time Interval). For example, one subframe may be referred to as TTI, a plurality of consecutive subframes may be referred to as TTI, or one slot may be referred to as TTI. A resource block (RB) is a resource allocation unit in the time domain and the frequency domain, and may include one or more consecutive subcarriers in the frequency domain. Additionally, the resource block may include one or more symbols in the time domain, and may have a length of one slot, one subframe, or one TTI. Each of one TTI and one subframe may be formed of one or more resource blocks. The above-described configuration of the radio frame is merely an example, and the number of subframes included in the radio frame, the number of slots included in the subframe, the number of symbols and resource blocks included in the slot, and the number of subcarriers included in the resource block can be variously changed.

The embodiments of the invention are described above in detail. However, the invention is not limited to the specific embodiments, and various modifications and changes may be made within a range of the gist of the invention described in the claims.

This application is based upon and claims the benefit of priority of Japanese Patent Application No. 2016-073455 filed on Mar. 31, 2016, and the entire contents of Japanese Patent Application No. 2016-073455 are incorporated herein by reference.

LIST OF REFERENCE SYMBOLS

10: Radio communication system
100: User equipment
110: Transmission and reception unit
120: Scheduling request control unit
200: Base station

The invention claimed is:

1. A user equipment, comprising:
a controller that determines a transmission period of a scheduling request in accordance with one or more scheduling request configurations including information on a transmission interval; and
a transceiver that transmits the scheduling request based on the transmission period,
wherein the controller applies, for each bearer of a plurality of bearers, one corresponding scheduling request configuration,
wherein the transceiver receives a transmission timing offset of the scheduling request, the offset being peculiar to each user equipment,
wherein the controller determines transmission timing of the scheduling request based on the transmission period, the offset, and the corresponding scheduling request configuration for each bearer of the plurality of bearers, and
wherein the transceiver transmits the scheduling request based on the transmission timing.

2. The user equipment according to claim 1, wherein the transceiver receives information on availability of the scheduling request, and
wherein the controller controls transmission of the scheduling request based on the information on availability.

3. The user equipment according to claim 1, wherein the controller performs random access if no scheduling request resource is available.

4. A transmission method by a terminal, the method comprising:
determining a transmission period of a scheduling request in accordance with one or more scheduling request configurations including information on a transmission interval;

receiving a transmission timing offset of the scheduling request, the offset being peculiar to each user equipment; and transmitting the scheduling request based on the transmission period and transmission timing, wherein, for each bearer of a plurality of bearers, one corresponding scheduling request configuration is applied, and wherein the transmission timing of the scheduling request is determined based on the transmission period, the offset, and the corresponding scheduling request configuration for each bearer of the plurality of bearers.

\* \* \* \* \*